US010091043B2

(12) United States Patent
Ma (10) Patent No.: US 10,091,043 B2
(45) Date of Patent: Oct. 2, 2018

(54) BOUNDARY DETECTION DEVICE AND WIRELESS COMMUNICATION DEVICE INCLUDING THE SAME

(71) Applicant: KABUSHIKI KAISHA TOSHIBA, Tokyo (JP)

(72) Inventor: Yuelin Ma, Yokohama Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/384,208

(22) Filed: Dec. 19, 2016

(65) Prior Publication Data

US 2017/0180109 A1 Jun. 22, 2017

(30) Foreign Application Priority Data

Dec. 21, 2015 (JP) .................................. 2015-248418

(51) Int. Cl.
*H04L 27/26* (2006.01)
*H04B 1/69* (2011.01)
*H04L 7/04* (2006.01)
*H04W 84/12* (2009.01)

(52) U.S. Cl.
CPC ........... *H04L 27/2655* (2013.01); *H04B 1/69* (2013.01); *H04L 7/042* (2013.01); *H04W 84/12* (2013.01)

(58) Field of Classification Search
CPC ..... H04L 7/0012; H04L 7/0037; H04L 7/042; H04L 27/2662; H04L 27/2656; H04L 27/2675; H04B 1/69; H04W 84/12
See application file for complete search history.

(56) References Cited

U.S. PATENT DOCUMENTS

| 5,541,926 A * | 7/1996 | Saito ................... H04Q 11/0478 370/395.6 |
| 2001/0015988 A1* | 8/2001 | Sawada .................... H04L 7/042 370/512 |
| 2004/0190560 A1* | 9/2004 | Maltsev .............. H04L 27/2663 370/503 |
| 2005/0243455 A1* | 11/2005 | Annampedu ........ G11B 7/0053 360/46 |
| 2006/0203926 A1* | 9/2006 | Chiodini ............. H04L 27/2613 375/260 |
| 2008/0299928 A1* | 12/2008 | Izumi ..................... H04B 1/001 455/226.3 |

(Continued)

OTHER PUBLICATIONS

Yuelin Ma et al., "A Novel Timing Synchronization Method for IEEE 802.11ax Uplink OFDMA Signal", Proceedings of the IEICE General Conference 2016, p. 535.

(Continued)

*Primary Examiner* — Sophia Vlahos
(74) *Attorney, Agent, or Firm* — Patterson & Sheridan, LLP (57) ABSTRACT

A boundary detection device includes a decorrelation filter and a boundary detector. The decorrelation filter is configured to output an output signal that has a decreased level with respect to an input signal when the input signal has a predetermined signal pattern, and that has a non-decreased level with respect to the input signal when the input signal does not have the predetermined signal pattern. The boundary detector is configured to detect an end of the predetermined signal pattern in the input signal, based on the output signal.

18 Claims, 7 Drawing Sheets

(56) References Cited

U.S. PATENT DOCUMENTS

2010/0091742 A1  4/2010  Lee et al.
2010/0128826 A1* 5/2010  Imamura .............. H03G 3/3052
                                                  375/345

OTHER PUBLICATIONS

Ho Huat Peh et al., "Frequency-Domain Timing Synchronization for IEEE 802.11n Communications Systems", IEEE 22nd International Symposium on Personal, Indoor and Mobile Radio Communications, 2011, pp. 859-863.

* cited by examiner

BOUNDARY DETECTION DEVICE AND WIRELESS COMMUNICATION DEVICE INCLUDING THE SAME

CROSS-REFERENCE TO RELATED APPLICATION

This application is based upon and claims the benefit of priority from Japanese Patent Application No. 2015-248418, filed Dec. 21, 2015, the entire contents of which are incorporated herein by reference.

FIELD

Embodiments described herein relate generally to a boundary detection device and a wireless communication device including the same.

BACKGROUND

In a wireless local area network (LAN) standard such as IEEE 802.11.a/n/ac, synchronization of a reception signal with a clock signal for processing is carried out using a plurality of training sequences which are included in a preamble of a frame of the reception signal. For example, a technology of calculating cross-correlation between a reception signal and a delayed reception signal and calculating a peak of the calculated cross-correlation corresponding to each of the training sequences is detected for the synchronization.

DETAILED DESCRIPTION

In the technology of using detection of a peak, it may not be possible to carry out the synchronization appropriately. For example, in a configuration using multi-antenna transmission in which cyclic shift is used or a configuration employing frequency selective fading, the peak may not be accurately detected due to an influence of the shift or the fading, and thus the synchronization may fail. If the synchronization fails, accurate demodulation of the reception signal is not possible.

In general, according to an embodiment, a boundary detection device includes a decorrelation filter and a boundary detector. The decorrelation filter is configured to output an output signal that has a decreased level with respect to an input signal when the input signal has a predetermined signal pattern, and that has a non-decreased level with respect to the input signal when the input signal does not have the predetermined signal pattern. The boundary detector is configured to detect an end of the predetermined signal pattern in the input signal, based on the output signal.

Appropriate embodiments of a detection device according to the present disclosure will be described below in detail with reference to the accompanying drawings.

First Embodiment

As described above, in the synchronization technology of using detection of a peak, an influence of cyclic shift or fading may prevent accurate detection of the peak, and thus synchronization may fail. Because the synchronization based on self-correlation of a signal is susceptible to a noise, reliability of the synchronization is low under an environment in which a SNR (signal to noise ratio) is low. Because the training sequence is also used in automatic gain control (AGC) performed before the synchronization, only some of a plurality of training sequences can be used for the synchronization. For that reason, the synchronization based on the self-correlation using only some of the plurality of training sequences may result in lower reliability of the synchronization.

According to the first embodiment, a filter (decorrelation filter) is used for reducing the level of the repetitive training sequence. The decorrelation filter does not detect a peak which is repeated corresponding to the training sequences. Instead, the decorrelation filter outputs a signal of significantly small (for example, zero) level when the training sequence is input. The decorrelation filter decreases levels of only the training sequences, and leaves levels of other signals unaffected. Thus, it is possible to increase a value of a signal output from the decorrelation filter at a boundary between an end of the training sequences and the subsequent signal. The synchronization is performed by sampling the value of the signal output from the decorrelation filter and detecting an increase of the sampled output value.

In this manner, according to the first embodiment, since a peak of cross-correlation is not detected, synchronization can be carried out more robustly (toughly) against cyclic shift or frequency selective fading. Also, since self-correlation is not calculated, synchronization can be carried out robustly even in an environment of low SNR.

Figure 1:
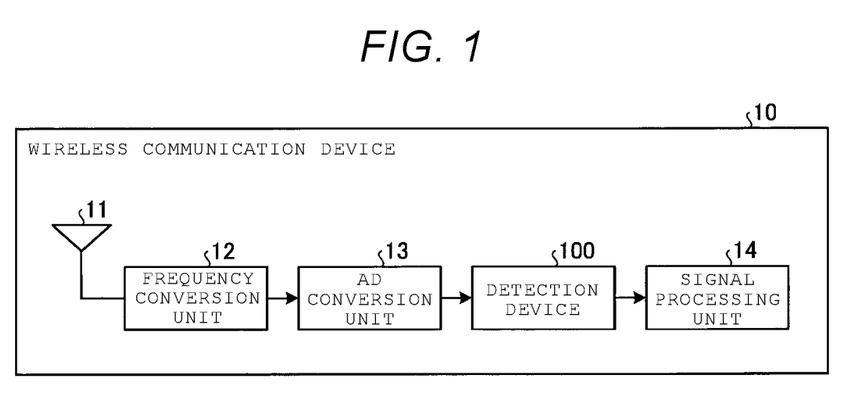
FIG. 1 is a block diagram illustrating a wireless communication device according to a first embodiment.

FIG. 1 is a block diagram of a wireless communication device 10 according to the first embodiment. As illustrated in FIG. 1, the wireless communication device 10 includes an antenna 11, a frequency conversion unit (circuit) 12, an AD (analog-to-digital) conversion unit (circuit) 13, a detection device 100, and a signal processing unit (circuit) 14. The configuration in FIG. 1 is an example, and other functional units (for example, filter, amplification unit) may be further included in the wireless communication device 10.

The antenna 11 receives a wireless signal which is transmitted from a device (transmission device), which is a communication counterpart. The frequency conversion unit 12 performs down-conversion of the received wireless signal, and outputs an analog baseband signal. The AD conversion unit 13 converts the analog baseband signal into a digital signal (reception signal).

The detection device 100 detects synchronization timing based on an input signal (input reception signal). For example, the detection device 100 detects a boundary between a plurality of training sequences and a signal which is subsequent to the training sequences. The detection device 100 outputs a signal indicating that the boundary is detected. A detailed configuration of the detection device 100 will be described below.

The signal processing unit 14 performs various types of processing on the reception signal after synchronizing with a timing detected by the detection device 100. For example, the signal processing unit 14 performs processing such as more fine timing synchronization (fine synchronization), fast Fourier transform (FFT), channel estimation, and demodulation. The processing performed by the signal processing unit 14 is not limited thereto. Any type of processing may be performed as long as the processing is performed on the reception signal after the detection device 100 detects the synchronization timing.

Figure 2:
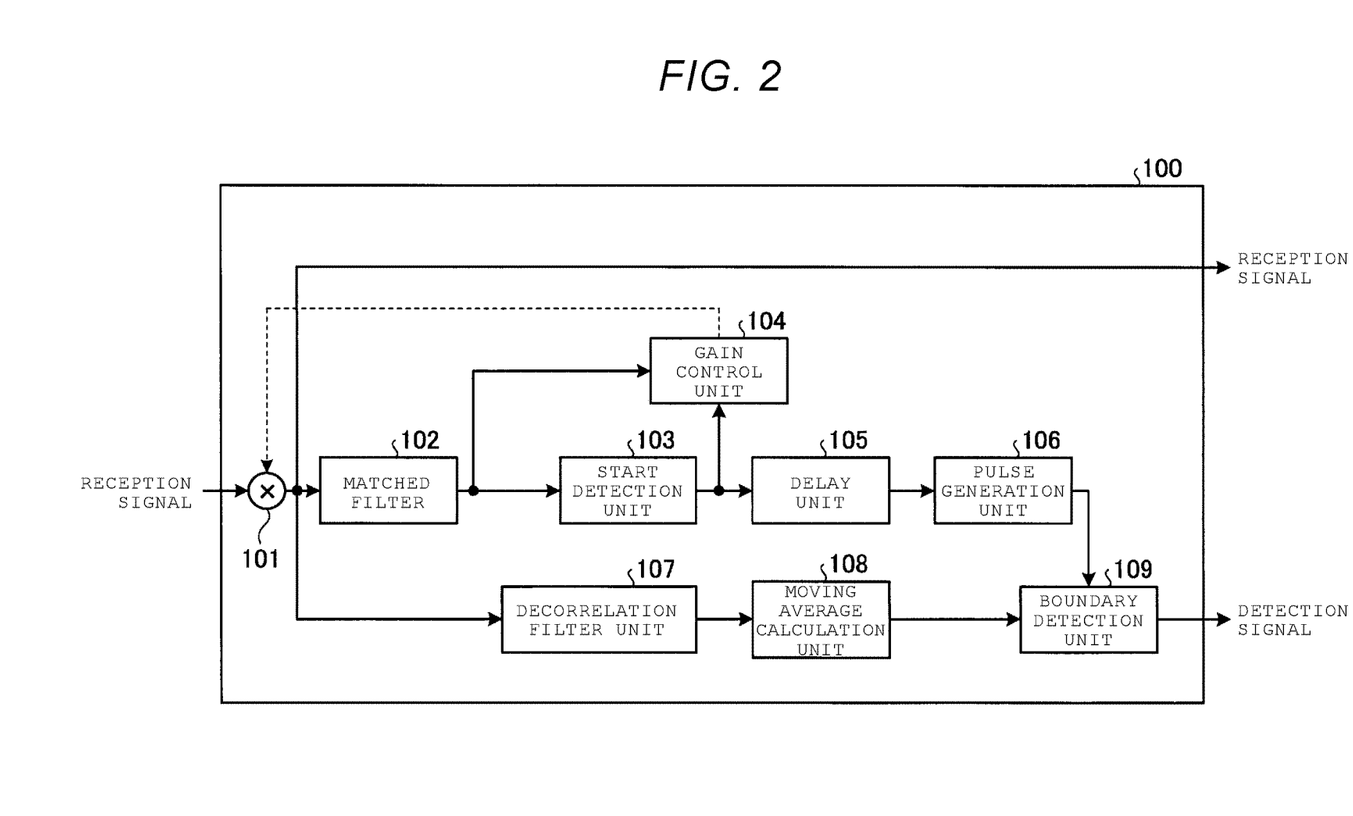
FIG. 2 is a block diagram illustrating a detection device according to the first embodiment, which is included in the wireless communication device.

Next, a configuration of the detection device 100 will be described. FIG. 2 is a block diagram of the detection device 100 according to the first embodiment. As illustrated in FIG. 2, the detection device 100 includes a multiplier unit (circuit) 101, a matched filter 102, a start detection unit (circuit) 103, a gain control unit (circuit) 104, a delay unit (circuit) 105, a pulse generation unit (circuit) 106, a decorrelation filter unit 107, a moving average calculation unit (circuit) 108, and a boundary detection unit (circuit) 109.

The multiplier unit 101 multiplies the reception signal by a gain adjustment value output from the gain control unit 104. The multiplier unit 101 may be configured by a variable gain amplifier, a multiplier in a digital domain, and the like, for example. Instead of the multiplier unit 101, a function of the AD conversion unit 13, which adjusts a reference voltage level thereof may be used. That is, the multiplier unit 101, if any, needs to include at least a function of adjusting level of an input signal in cooperation with the gain control unit 104.

The matched filter 102 functions as a correlation calculation unit which outputs a correlation signal, which indicates correlation between the reception signal an a specific signal. The specific signal is, for example, a predetermined signal used for synchronization processing. For example, the specific signal may be a short training sequence (STS) which is defined in the IEEE 802.11.a/n/ac standard, and the like.

Figure 3:
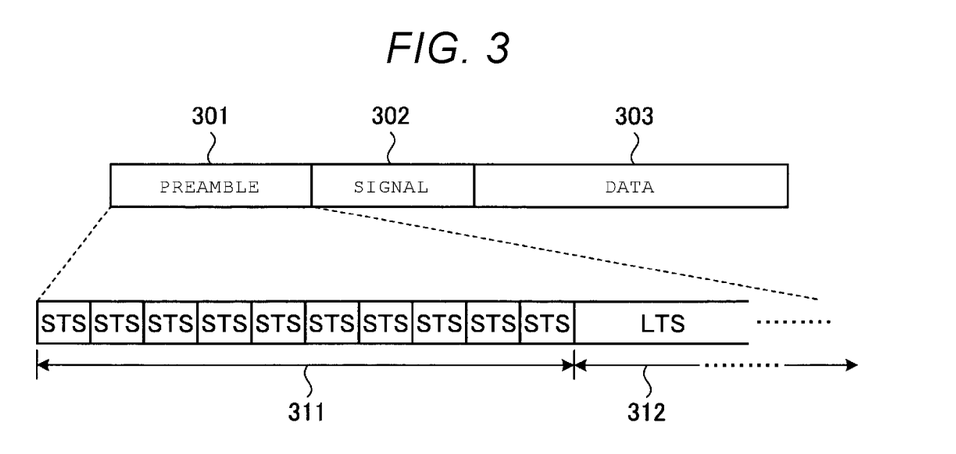
FIG. 3 illustrates a frame structure of a reception signal according to the first embodiment.

FIG. 3 illustrates a frame structure of the reception signal that is applicable to the present embodiment. As illustrated in FIG. 3, a frame of the reception signal includes a preamble field 301, a signal field 302, and a data field 303.

The preamble field 301 includes a training signal. The training signal is divided into a short training field (STF) 311 and a long training field (LTF) 312. The STF 311 includes a plurality of short training sequences (STS). The LTF 312 includes one or more long training sequences (LTS) which are training sequences longer than the STS. The number of long training sequences included in the LTF 312 is smaller than the number of short training sequences included in the STF 311.

In the present embodiment, the synchronization processing is performed using the STS. For that reason, the LTS may not be included in the reception signal. That is, as long as the reception signal includes a specific signal corresponding to the STS and the like in FIG. 3, the present embodiment can be applied to the reception signals.

The signal field 302 is a field including information other than the information included in the preamble field 301. For example, the signal field 302 includes a PLCP (Physical Layer Convergence Protocol) header, and the like. The data field 303 is a field which includes received data.

Returning to FIG. 2, the matched filter 102 is configured so that a filtering criteria has a high correlation with the STS in FIG. 3. That is, if an input signal matches with the filtering criteria of the matched filter 102, a peak appears in an output of the matched filter 102. The output of the matched filter 102 is used in the start detection unit 103 and the gain control unit 104.

The start detection unit 103 determines whether or not reception of a signal (frame) is started. Before the signal is received, only a noise is detected. Thus, when a rising edge of amplitude or power of a reception signal is detected, the start detection unit 103 detects a start of signal reception. When the start of the signal is detected, the start detection unit 103 outputs an enable signal to the gain control unit 104 and the delay unit 105.

The gain control unit 104 starts AGC in response to reception of the enable signal. The gain control unit 104 automatically adjusts power of the reception signal, such that the gain control unit 104 sets a usable dynamic range to be the maximum, and avoids overloading to a front end such as the multiplier unit 101. For example, the gain control unit 104 performs feedback of the gain adjustment value to the multiplier unit 101. The multiplier unit 101 multiplies the gain adjustment value by the reception signal, so as to adjust power of the reception signal.

The delay unit 105 delays the enable signal output from the start detection unit 103, in order to synchronize with the AGC performed by the gain control unit 104. For example, the delay unit 105 delays the enable signal by a period of time required for the gain control unit 104 to perform the AGC.

The pulse generation unit 106 generates a pulse signal, in response to the delayed enable signal. The pulse generation unit 106 generates the pulse signal at an interval which is the same as a length of the STS, for example. The interval of the pulse signal is not limited thereto. Any interval may be used as long as the interval does not influence on detection accuracy of the boundary of the STS by the boundary detection unit 109. For example, the interval may be set to be shorter than the STS, in order to improve the detection accuracy.

The decorrelation filter unit 107 functions as a decorrelation filter that generates an output signal having a level lower than that of the reception signal, when the reception signal is the specific signal (STSs). For example, the decorrelation filter unit 107 is configured to output zero when the STSs are input. The decorrelation filter unit 107 does not change levels of signals other than STSs which are input subsequently to the SPSs, that is, data in the LTF 312, data in the signal field 302, and data in the data field 303. The decorrelation filter unit 107 outputs these signals of the data without change.

The moving average calculation unit 108 outputs a signal obtained by smoothing the output signal from the decorrelation filter unit 107. For example, the moving average calculation unit 108 calculates a moving average of the output signal, and outputs a signal corresponding to the calculated moving average. The moving average calculation unit 108 may be configured by a finite impulse response (FIR) filter, an infinite impulse response (IIF) filter, and the like. The moving average calculation unit 108 may not be included in the detection device 100.

The boundary detection unit 109 detects a boundary of the reception signal, based on changed level of the output signal. The boundary indicates an end of the specific signal (STSs) included in the reception signal. For example, the boundary detection unit 109 detects the boundary when the output signal is changed from a value (for example, zero) of the output signal (suppression signal) when the reception signal is an STS, to a value different from that of the suppression signal.

The boundary detection unit 109 performs a sampling function and a determination function, for example. The sampling function performs sampling of the output signal using a pulse signal which is generated by the pulse generation unit 106 as a trigger signal. Thus, the output signal is sampled at an interval determined by the pulse signal. The determination function performs monitoring of the sampled output signal and determining whether or not the level of the output signal is changed. For example, when it is detected that the value of the output signal is increased, it is determined that the boundary between STSs and a signal which is subsequent to the STSs, that is, a boundary indicating an end of the STSs is detected.

Each of the units (the multiplier unit 101, the matched filter 102, the start detection unit 103, the gain control unit 104, the delay unit 105, the pulse generation unit 106, the decorrelation filter unit 107, the moving average calculation unit 108, and the boundary detection unit 109) of the detection device 100 in the present embodiment may be implemented by, for example, a hardware circuit such as an application specific integrated circuit (ASIC) or a field-programmable gate array (FPGA). At least a portion of each of the units may be implemented by a common hardware circuit.

Each of the units (frequency conversion unit 12, AD (analog-to-digital) conversion unit, and signal processing unit) of the wireless communication device 10 in the present embodiment may be implemented by software, that is, by causing a processing device such as a central processing unit (CPU) to execute a program. Each of the above units may be implemented by a hardware circuit such as an ASIC or an FPGA, or may be implemented by a combination of hardware and software.

Figure 4:
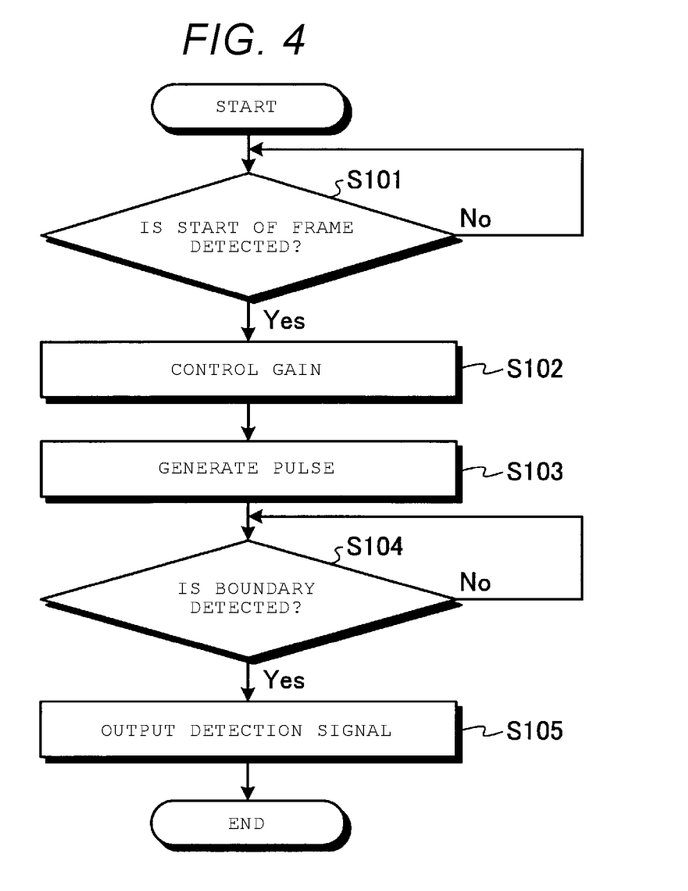
FIG. 4 is a flowchart illustrating synchronization detection processing according to the first embodiment.

Next, synchronization detection processing performed by the detection device 100 according to the first embodiment, which is configured as described above, will be described with reference to FIG. 4. FIG. 4 is a flowchart illustrating an example of the synchronization detection processing according to the first embodiment.

A wireless signal is received by the antenna 11 of the wireless communication device 10. The reception signal is output after the wireless signal is processed by the frequency conversion unit 12 and the AD conversion unit 13, and input to the detection device 100. In this state, the matched filter 102 outputs a correlation signal indicating correlation between the input reception signal and the STS. The decorrelation filter unit 107 generates an output signal having a level that is lower than when receiving the STSs from the input reception signal.

Firstly, the start detection unit 103 determines whether or not a start of a frame is detected (Step S101). When, for example, a rising edge of amplitude or power of the output signal from the matched filter 102 is detected, the start detection unit 103 determines that the start of the frame is detected. When the start of the frame is not detected (No in Step S101), the start detection unit 103 repeats the process until the start of the frame is detected. When the start of the frame is detected (Yes in Step S101), the start detection unit 103 outputs the enable signal to the gain control unit 104 and the delay unit 105.

When the gain control unit 104 receives the enable signal, the gain control unit 104 performs gain control processing (AGC) (Step S102). The delay unit 105 delays the enable signal by, for example, a period of time required for the gain control unit 104 to perform the AGC. After the delay time elapses, when the enable signal is input to the pulse generation unit 106, the pulse generation unit 106 generates a pulse signal (Step S103).

The boundary detection unit 109 starts detection processing of the boundary of the reception signal based on the output signal derived from the decorrelation filter unit 107, and determines whether or not the boundary is detected (Step S104). For example, the boundary detection unit 109 starts sampling of the output signal from the moving average calculation unit 108, in synchronization with the pulse signal generated by the pulse generation unit 106. The boundary detection unit 109 performs calculation of a determination formula for detecting the boundary, by using the sampled output signal and a predetermined threshold value. When a calculation result is determined to be true, the boundary detection unit 109 determines that the boundary indicating an end of the STSs is detected.

When it is determined that the boundary is not detected (No in Step S104), the boundary detection unit 109 repeats the process until the boundary is determined to be detected. When the boundary is determined to be detected (Yes in Step S104), the boundary detection unit 109 outputs a detection signal indicating that the boundary is detected, for example (Step S105). As a result, the processing units (signal processing unit 14 and the like) at the subsequent stage may perform processing on the reception signal in synchronization with the detection signal.

Figure 5:
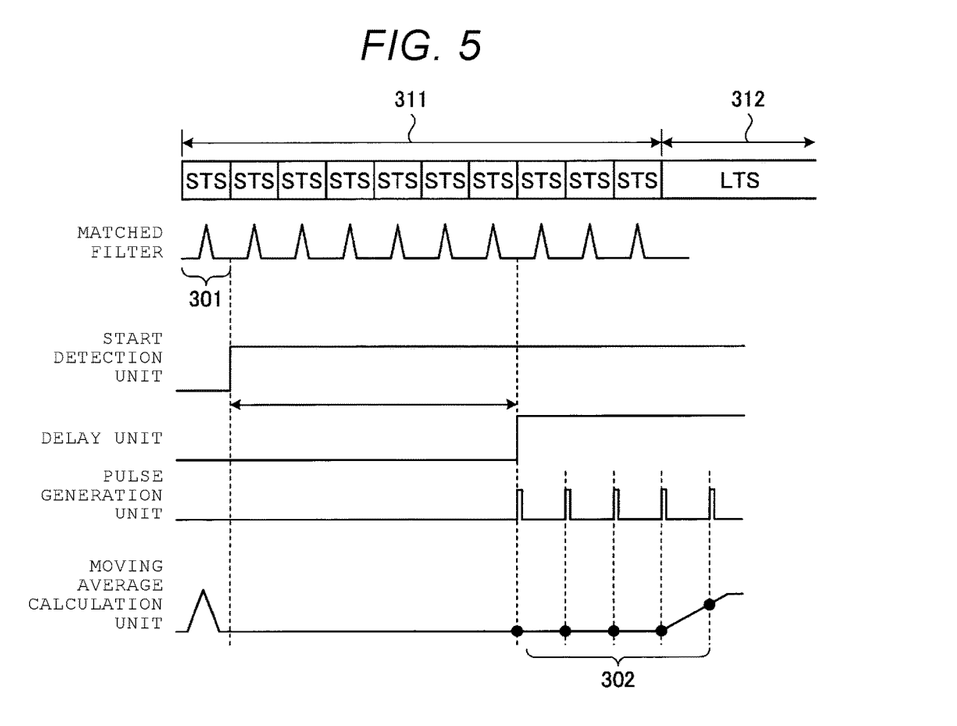
FIG. 5 illustrates relation between signals output from respective units of the detection device.

FIG. 5 illustrates relations between signals output from the respective units of the detection device 100. The top of FIG. 5 indicates the STF 311 and the LTF 312 in a frame. An example of signals output from each of the matched filter 102, the start detection unit 103, the delay unit 105, the pulse generation unit 106, and the moving average calculation unit 108 is illustrated at a lower part of FIG. 5.

As illustrated in FIG. 5, a signal (correlation signal) output by the matched filter 102 is repeated in accordance with each of STSs included in the STF 311. For example, when 10 STSs are included in the STF 311, the matched filter 102 outputs a correlation signal which has 10 peaks.

A period 301 corresponding to the first STS is used for determining start of a frame. Thus, the enable signal is generated after the period 301 corresponding to the first STS. The enable signal may be set to be, for example, Boolean data which has one of two values of 0 and 1.

The enable signal is delayed by a period of time required for the gain control unit 104 to complete gain adjustment (AGC). For example, the period of time is integer multiple of the period of the STS. In this case, a timing of the subsequent processing is carried out based on a period of STS. The pulse generation unit 106 generates a pulse train in response to reception of the delayed enable signal. As indicated by the period 302, each pulse in the pulse train is generated at an interval which is the same as the STS.

An output signal which is output from the decorrelation filter unit 107 and then is smoothed by the moving average calculation unit 108 is zero for a period of the STF 311 excluding the period 301 for the first STS. The value of the output signal increases at an end of the STF 311. The increase of the value indicates the boundary between the STF 311 and a signal subsequent to the STF 311 (i.e., the LTS 312 in FIG. 5).

The smoothed output signal is sampled so as to synchronize with each pulse of the pulse train. Thus, the output signal has the same sampling period as the period of the STS. The pulse train may be generated so as to have peaks concurrently to peaks of the output signal from the matched filter 102.

Comparison between the output signal and the threshold value, or comparison between the current output signal (first output signal) and the previous one or more output signals (second output signals) enables detection of rising of the output signal. As a result, synchronization of timing is achieved. This corresponds to coarse synchronization. A shift of timing in a predetermined period does not influence fine synchronization which is performed after the coarse synchronization.

The detection processing of the boundary performed by the boundary detection unit 109 may be carried out by various methods. For example, a method of monitoring whether or not an output signal xdec(t) subjected to sampling exceeds a threshold value (xdec(t)>threshold) may be employed. Here, t indicates time at which the output signal is subjected to sampling.

A method of monitoring whether or not an output signal xdec(t) at a time instant t exceeds a value of the weighted sum of two output signals xdec(t−T) and xdec(t−2T) which are previously subjected to sampling (xdec(t)>a·xdec(t−T)+b·xdec(t−2T)) may be employed. Here, a and b are integers, and T indicates the period of an STS. The number of previous output signals is not limited to 2, and may be any value as long as the number of previous output signals is equal to or more than 1.

Figure 6:
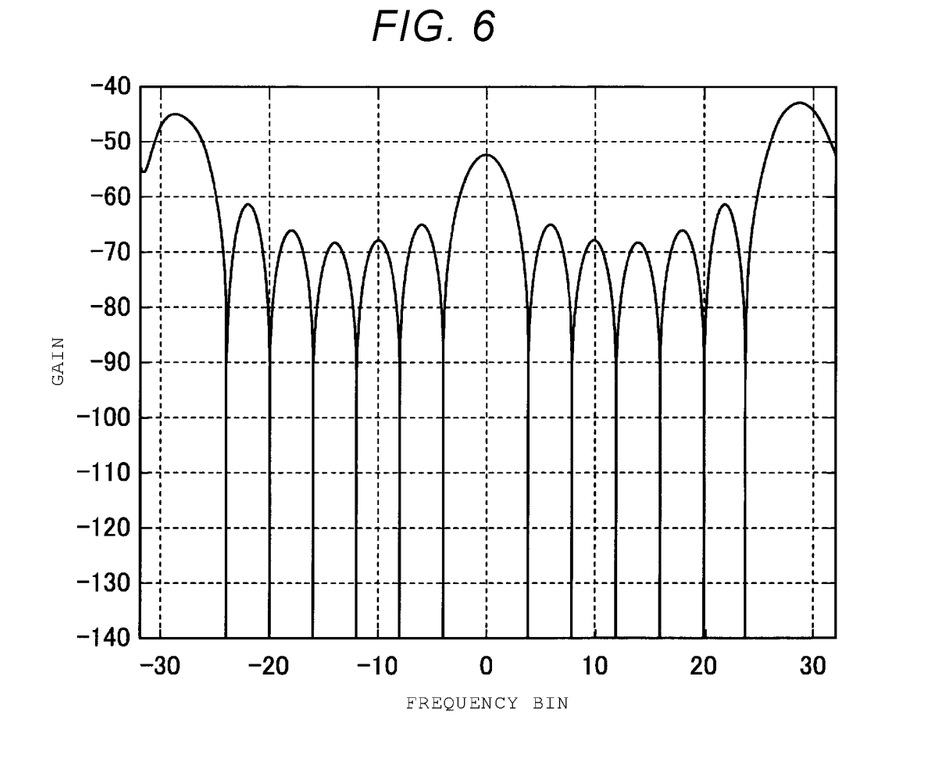
FIG. 6 illustrates a frequency response of a decorrelation filter of the detection device.

FIG. 6 illustrates an example of a frequency response of the decorrelation filter unit 107 for an STS defined in the IEEE 802.11.a/n/ac standard. An STS used in a preamble for signals conforming to the IEEE 802.11.a/n/ac standard has tones at positions of frequency bins of ±4, ±8, ±12, ±16, ±20, and ±24 which match with a notch frequency of the decorrelation filter unit 107. Since the STS is a periodic signal, the decorrelation filter unit 107 may be realized by a smaller-ordered FIR filter. Thus, the hardware configuration thereof can be further simplified.

Figure 7:
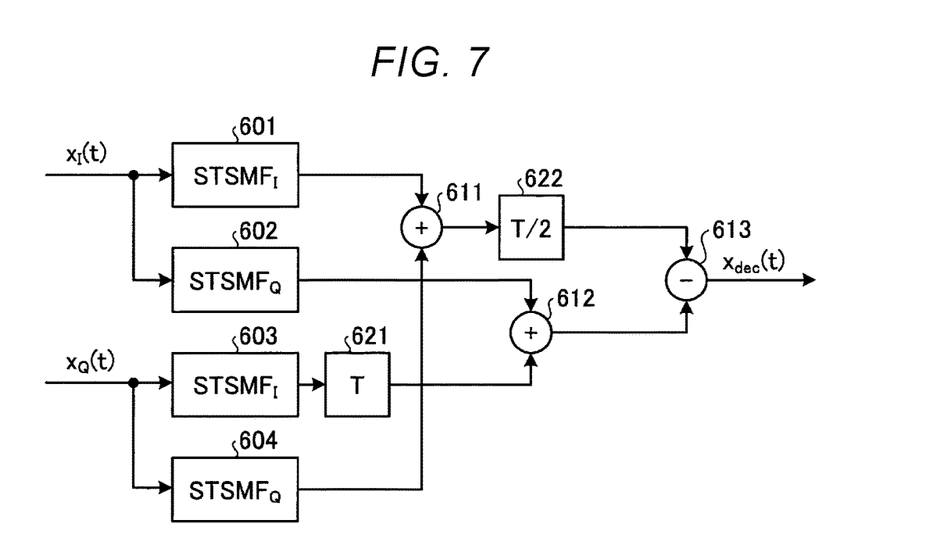
FIG. 7 illustrates a configuration of the decorrelation filter.

FIG. 7 illustrates a configuration of the decorrelation filter unit 107 according to an embodiment. As illustrated in FIG. 7, the decorrelation filter unit 107 includes a short training sequence matched filter (STSMF)$_I$ 601, an STSMF$_Q$ 602, an STSMF$_I$ 603, an STSMF$_Q$ 604, two addition circuits 611 and 612, a subtraction circuit 613, and two delay circuits 621 and 622.

The STSMF$_I$ 601 and the STSMF$_I$ 603 correspond to the real portion of an STS matched filter. The STSMF$_Q$ 602 and the STSMF$_Q$ 604 correspond to the imaginary portion of the STS matched filter. The STS matched filter is a filter which outputs a correlation signal indicating correlation with an STS. When an STS is used as the specific signal, the matched filter 102 functions as the STS matched filter.

The real portion $x_1(t)$ of the reception signal is input to the STSMF$_I$ 601 and the STSMF$_Q$ 602. The imaginary portion $x_Q(t)$ of the reception signal is input to the STSMF$_I$ 603 and the STSMF$_Q$ 604.

The addition circuit 611 adds the output of the STSMF$_I$ 601 and the output of the STSMF$_Q$ 604. The delay circuit 621 delays an output of the STSMF$_I$ 603 by the period T of the STS. The addition circuit 612 adds an output of the STSMF$_Q$ 602 and an output of the delay circuit 621. The delay circuit 622 delays an output of the addition circuit 611 by T/2 (half of the period T of the STS). The subtraction circuit 613 subtracts an output of the addition circuit 612 from an output of the delay circuit 622.

Figure 8:
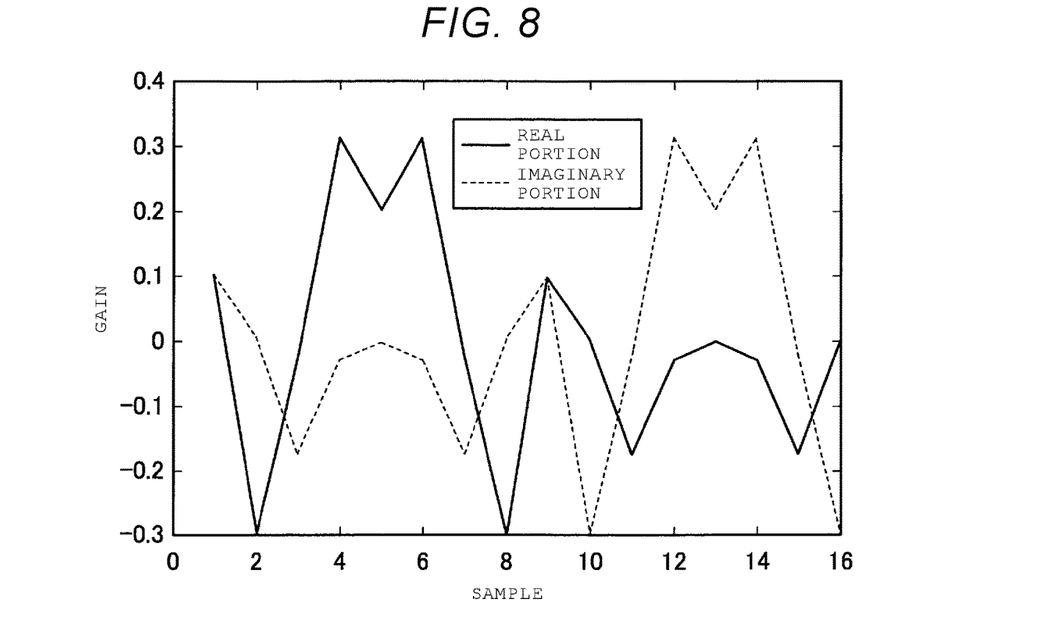
FIG. 8 illustrates a periodic characteristic of an STS.

The decorrelation filter unit 107 illustrated in FIG. 7 uses a periodic characteristic of the STS defined in the IEEE 802.11.a/n/ac standard. FIG. 8 illustrates an example of the periodic characteristic of an STS. As illustrated in FIG. 8, the real portion and the imaginary portion of the STS are shifted in a period of T/2. Since the STF includes 10 STSs, following relations are established:

$$x_I(t)=x_Q(t-T/2)$$

$$x_Q(t)=x_I(t-T/2)$$

$$x_I(t)=x_I(t-T)$$

$$x_Q(t)=x_Q(t-T)$$

The output of the decorrelation filter unit 107 is given by the following formula:

$$x_I(t-T/2)*\text{STSMF}_I+x_Q(t-T/2)*\text{STSMF}_Q-[x_I(t)\\*\text{STSMF}_Q+x_Q(t-T)*\text{STSMF}_I]$$

When the relations above are combined with this formula, the following equation is established:

$$x_Q(t)*\text{STSMF}_I+x_I(t)*\text{STSMF}_Q-[x_I(t)*\text{STSMF}_Q+x_Q(t)\\*\text{STSMF}_I]=0$$

where the symbol "*" indicates a convolution operation.

In this manner, the output of the decorrelation filter unit 107 when the STS is input becomes zero.

The configuration of the decorrelation filter unit 107 in FIG. 7 is an example, and is not limited thereto. For example, the decorrelation filter unit 107 may be a filter which delays at least one of the real portion and the imaginary portion of the reception signal, performs at least one of addition and subtraction for the real portion and the imaginary portion of the reception signal after the delay, and outputs zero. In a case of the decorrelation filter unit 107 having the configuration illustrated in FIG. 7, for example, some or all of the STSMF$_I$ 601, the STSMF$_Q$ 602, the STSMF$_I$ 603, and the STSMF$_Q$ 604 may be commonly used with the matched filter 102. Thus, the hardware configuration can be further simplified.

In this manner, in the detection device according to the first embodiment, an output signal having level lower than that of the STSs included in the reception signal is output, and a boundary indicating the end of the STSs is detected based on changed level of the output signal. In the present embodiment, since peaks of cross-correlation are not detected, synchronization can be carried out more robustly against cyclic shift or frequency selective fading. As a result, timing can be synchronized more appropriately.

Second Embodiment

A detection device according to a second embodiment uses a decorrelation filter. The decorrelation filter generates an output signal having level lower than that of the reception signal when the reception signal is an STS, based on an output of the matched filter.

Figure 9:
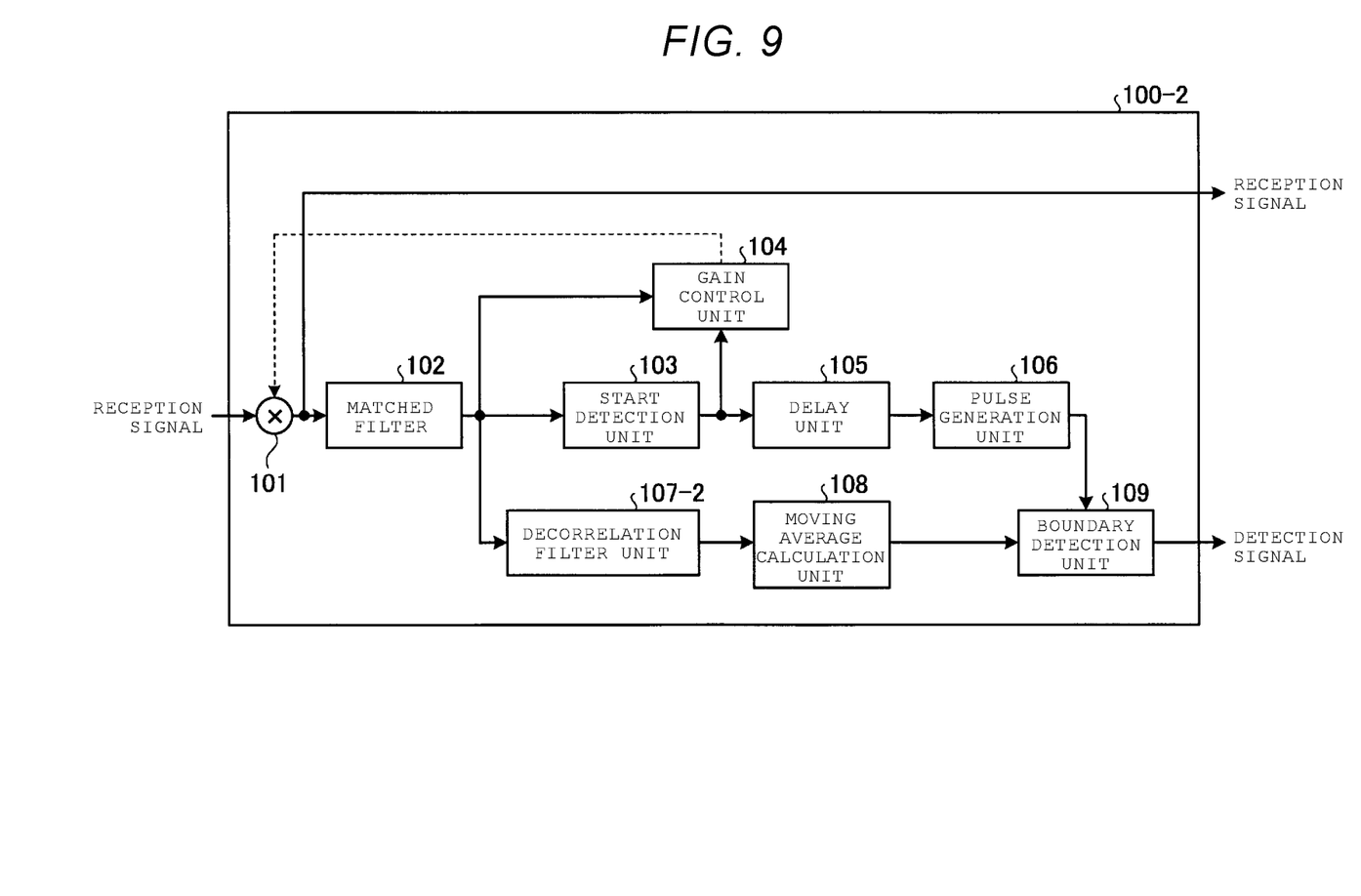
FIG. 9 is a block diagram illustrating a detection device according to a second embodiment.

FIG. 9 is a block diagram of a detection device 100-2 according to the second embodiment. As illustrated in FIG. 9, the detection device 100-2 includes a multiplier unit 101, a matched filter 102, a start detection unit 103, a gain control unit 104, a delay unit 105, a pulse generation unit 106, a decorrelation filter unit 107-2, a moving average calculation unit 108, and a boundary detection unit 109.

In the second embodiment, a function of the decorrelation filter unit 107-2 is different from that of the decorrelation filter unit 107 in the first embodiment. Other components and functions are similar to those of the detection device 100 illustrated in FIG. 2 according to the first embodiment.

Those components and functions are denoted by the same reference signs, and description thereof are thus omitted.

The decorrelation filter unit 107-2 is disposed on a downstream of the matched filter 102. The decorrelation filter unit 107-2 uses a correlation signal output by the matched filter 102, as an input. Similar to the decorrelation filter unit 107 according to the first embodiment, the decorrelation filter unit 107-2 according to the second embodiment is configured to generate an output signal having a level lower than that of a reception signal, when the reception signal is an STS.

An example of a calculation method of a filter coefficient in the decorrelation filter unit 107-2 will be described below. In the following method, oversampling is not assumed.

First, the following (1) expression and (2) expression are calculated as initialization processing. Here, h(n) is a vector of n columns×1 line which uses the filter coefficients of the matched filter 102 as an element. The integer n indicates the number of filter coefficients (integer of 1 or more). A case of n=16 is described below as an example. However, n may be a value other than 16.

$$\underset{16\times 16}{H} = \begin{bmatrix} h(n) & \underset{\text{circular shift}}{h(n-1)} & \cdots & \underset{\text{circular shift}}{h(n-15)} \end{bmatrix} \quad (1)$$

$$U = \underset{16\times 16}{\begin{bmatrix} 1 & \cdots & 0 \\ \vdots & \ddots & \vdots \\ 0 & \cdots & 1 \end{bmatrix}} \quad (2)$$

In the expression (1), h(n−1) indicates a vector obtained by performing cyclic shift of an element of h(n). A matrix H of 16 columns×16 lines is a matrix which includes a vector obtained by performing cyclic shift of a vector one by one in a similar manner. U in the expression (2) is a unit matrix of 16 columns×16 lines.

Then, each operation indicated in the following expression (3) is repeated for k=1 to 15. First, a unit matrix of 16 columns×16 lines is set in a matrix α. A vector corresponding to the k-th line in the matrix H is set as the vector h.

(3)

Then, the following four operations are repeated for m=k+1 to 16. First, a vector corresponding to the m-th line in the matrix H is set as a vector β. A value of $h^H\beta/h^H h$ is set in an element α(k, m) at the k-th column and the m-th line in the matrix α. $h^H$ means a matrix obtained by performing complex transposition of h. β−α(k, m)h is set in the vector β. β is set in the m-th line in the matrix H.

After repeating for m=k+1 to 16, a product of U and α is set in a matrix U. A value obtained by dividing the k-th line of the matrix U by a norm of h is set in the k-th line in the matrix U.

Then, the following expression (4) and expression (5) are calculated in final processing. As indicated by the expression (4), a vector $h_{dec}$ (n) which uses a filter coefficient of the decorrelation filter unit 107-2 as an element corresponds to a vector of the 16th line in the matrix U. In the expression (5), each element of $h_{dec}(n)$ is divided by the maximum value of the element (normalization).

$$h_{dec}(n) = U(:,16) \quad (4)$$

$$h_{dec}(n) = \frac{h_{dec}(n)}{\max\{h_{dec}(n)\}} \quad (5)$$

According to the algorithm, it is possible to calculate n items (n is an integer of 1 or more) of filter coefficients of the decorrelation filter unit 107-2 by using n items of filter coefficients of the matched filter 102. In this manner, since the decorrelation filter unit 107-2 can be configured by filter coefficients of which number is the same as those of the matched filter 102, the hardware configuration can be further simplified.

As described above, according to the first and second embodiments, since peaks of cross-correlation are not detected, synchronization can be carried out more robustly against the cyclic shift or frequency selective fading, and as a result timing can be synchronized more appropriately.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A boundary detection device comprising:
   a decorrelation filter configured to output an output signal that has a decreased level with respect to an input signal when the input signal has a predetermined signal pattern, and that has a non-decreased level with respect to the input signal when the input signal does not have the predetermined signal pattern;
   a boundary detector configured to detect an end of the predetermined signal pattern in the input signal, based on the output signal; and
   a matched filter configured to receive the input signal and output a pulse when the input signal has the predetermined signal pattern, wherein
   the boundary detector is configured to sample the output signal to detect the end of the predetermined signal pattern in the input signal at a timing of a pulse signal generated based on the pulse from the matched filter.

2. The boundary detection device according to claim 1, wherein
the decorrelation filter generates the output signal by delaying one of a real portion and an imaginary portion of the input signal relative to the other one of the real portion and the imaginary portion of the input signal by a predetermined period of time, and calculating at least one of addition and subtraction of the delayed portion and a non-delayed portion of the input signal.

3. The boundary detection device according to claim 1, wherein
the boundary detector detects the end of the predetermined signal pattern when the output signal changes from the decreased level to the non-decreased level.

4. The boundary detection device according to claim 1, wherein
an output of the matched filter is input to the decorrelation filter.

5. The boundary detection device according to claim 1, wherein
the boundary detector detects the end of the predetermined signal pattern when a sampled value of the output signal is equal to or greater than a predetermined value.

6. The boundary detection device according to claim 1, wherein
the boundary detector detects the end of the predetermined signal pattern when a difference between a sampled value and a previously sampled value of the output signal is greater than a predetermined value.

7. The boundary detection device according to claim 1, wherein
the boundary detector detects the end of the predetermined signal pattern when a sampled value of the output signal is greater than a weighted sum of a plurality of previously sampled values of the output signal.

8. The boundary detection device according to claim 1, wherein
a filter coefficient of the matched filter is same as a filter coefficient of the decorrelation filter.

9. The boundary detection device according to claim 1, wherein
the predetermined signal pattern corresponds to a training sequence included in a wireless signal conforming to a wireless local area network (LAN) standard.

10. A wireless communication device, comprising:
an antenna;
an analog-to-digital converter configured to convert an analog signal received by the antenna to a digital signal; and
a boundary detection device including:
a decorrelation filter configured to output an output signal that has a decreased level with respect to a signal input thereto when the digital signal has a predetermined signal pattern, and that has a non-decreased level with respect to the digital signal when the digital signal does not have the predetermined signal pattern;
a boundary detector configured to detect an end of the predetermined signal pattern in the digital signal, based on the output signal; and
a matched filter configured to receive the digital signal and output a pulse when the digital signal has the predetermined signal pattern, wherein
the boundary detector is configured to sample the output signal to detect the end of the predetermined signal pattern in the digital signal at a timing of a pulse signal generated based on the pulse from the matched filter.

11. The wireless communication device according to claim 10, further comprising:
a signal processor configured to carry out synchronization of the digital signal based on detection of the end of the predetermined signal pattern by the boundary detection device.

12. The wireless communication device according to claim 10, wherein
the decorrelation filter generates the output signal by delaying one of a real portion and an imaginary portion of the signal input thereto relative to the other of the real portion and the imaginary portion of the signal input thereto by a predetermined period of time, and calculating at least one of addition and subtraction of the delayed portion and a non-delayed portion of the digital signal.

13. The wireless communication device according to claim 10, wherein
the boundary detector detects the end of the predetermined signal pattern when the output signal changes from the decreased level to the non-decreased level.

14. The wireless communication device according to claim 10, wherein
an output of the matched filter is input to the decorrelation filter.

15. The wireless communication device according to claim 10, wherein
the boundary detector detects the end of the predetermined signal pattern when a sampled value of the output signal is equal to or greater than a predetermined value.

16. The wireless communication device according to claim 10, wherein
the boundary detector detects the end of the predetermined signal pattern when a difference between a sampled value and a previously sampled value of the output signal is greater than a predetermined value.

17. The wireless communication device according to claim 10, wherein
the boundary detector detects the end of the predetermined signal pattern when a sampled value of the output signal is greater than a weighted sum of a plurality of previously sampled values of the output signal.

18. The wireless communication device according to claim 10, wherein
the predetermined signal pattern corresponds to a training sequence included in a wireless signal conforming to a wireless local area network (LAN) standard.

* * * * *